US012789333B2

United States Patent

Vandenberg et al.

(12) United States Patent
(10) Patent No.: US 12,789,333 B2
(45) Date of Patent: Nov. 10, 2026

(54) FASTENER INSTALLATION SYSTEM AND RELATED METHOD

(71) Applicant: National Nail Corp., Grand Rapids, MI (US)

(72) Inventors: Roger A. Vandenberg, Hudsonville, MI (US); Todd E. A. Schwartzkopf, Hudsonville, MI (US); Christopher M. Colyn, Grandville, MI (US)

(73) Assignee: National Nail Corp., Grand Rapids, MI (US)

( * ) Notice: Subject to any disclaimer, the term of this patent is extended or adjusted under 35 U.S.C. 154(b) by 222 days.

(21) Appl. No.: 18/801,978

(22) Filed: Aug. 13, 2024

(65) Prior Publication Data

US 2026/0048489 A1 Feb. 19, 2026

(51) Int. Cl.
*B25B 23/08* (2006.01)

(52) U.S. Cl.
CPC .................................... *B25B 23/08* (2013.01)

(58) Field of Classification Search
CPC . B25B 23/005; B25B 23/08; Y10T 29/49895; Y10T 29/49947; Y10T 29/53909
See application file for complete search history.

(56) References Cited

U.S. PATENT DOCUMENTS 4,475,726 A 10/1984 Smith
6,131,434 A 10/2000 Schneider, Jr.
8,382,414 B2 * 2/2013 Vandenberg .......... F16B 25/103 411/386
8,480,343 B2 * 7/2013 Vandenberg ............ B25B 23/00 411/413
8,672,204 B2 * 3/2014 Vandenberg ............ B25B 23/00 227/151
8,925,644 B2 * 1/2015 Vandenberg ............ B25B 23/00 227/151
8,955,210 B2 * 2/2015 Vandenberg ............ B25B 23/00 173/1
9,120,214 B2 * 9/2015 Vandenberg ........ F16B 25/0015
9,144,896 B2 * 9/2015 Vandenberg ............ F16B 25/00

(Continued)

FOREIGN PATENT DOCUMENTS

EP 3708303 A1 * 9/2020 ............. B25B 23/04
FR 3142925 A1 * 6/2024 ........... B25B 23/005

(Continued)

*Primary Examiner* — David B. Thomas
(74) *Attorney, Agent, or Firm* — Warner Norcross + Judd LLP

(57) ABSTRACT

A fastener installation tool can include a handle and a nose assembly including a guide defining a bore having a longitudinal axis, a first tooth adjacent the bore and a second tooth. The first tooth can fixedly join with the nose assembly and selectively engage a round upper corner between an upper surface and a side surface of a board. The second tooth can join with the nose assembly and can move from a retracted mode to an extended mode in which the second tooth is configured to engage the side of the board. The longitudinal axis can be oriented by the first and/or second tooth engaging the board to place that axis at a point of intersection with the board at a first depth being 0.010 inches to 0.125 inches, inclusive, or about 0.050 inches, below a lower surface of the handle. A related method of use is provided.

20 Claims, 7 Drawing Sheets

(56) References Cited

U.S. PATENT DOCUMENTS

| | | | | |
|---|---|---|---|---|
| 9,751,197 | B2 | 9/2017 | Vandenberg | |
| 9,784,296 | B2 | 10/2017 | Vandenberg | |
| 9,802,300 | B2 * | 10/2017 | Vandenberg | B25B 21/002 |
| 9,969,068 | B2 * | 5/2018 | Walters | B25B 21/002 |
| 10,315,295 | B2 * | 6/2019 | Vandenberg | B25B 23/005 |
| 10,378,218 | B2 | 8/2019 | Vandenberg | |
| 10,406,659 | B2 * | 9/2019 | Dicaire | B25B 21/002 |
| 10,576,612 | B2 * | 3/2020 | Vandenberg | B25B 23/005 |
| 10,603,768 | B2 * | 3/2020 | Irwin | B25F 3/00 |
| 10,850,373 | B2 * | 12/2020 | Vandenberg | B25B 23/08 |
| 10,859,109 | B2 * | 12/2020 | Walters | B25B 21/007 |
| 11,268,561 | B2 * | 3/2022 | Walters | B25F 3/00 |
| 11,731,252 | B2 * | 8/2023 | Schwartzkopf | B25B 23/005 29/428 |
| 11,938,596 | B1 * | 3/2024 | Vandenberg | B25B 23/005 |
| 11,969,863 | B2 * | 4/2024 | Schwartzkopf | B25B 23/005 |
| 11,999,032 | B2 * | 6/2024 | Schwartzkopf | B25B 23/005 |

FOREIGN PATENT DOCUMENTS

| | | | | |
|---|---|---|---|---|
| SE | 545521 | C2 * | 10/2023 | B25B 5/12 |
| WO | WO-2023163628 | A1 * | 8/2023 | B25B 5/12 |

* cited by examiner

FASTENER INSTALLATION SYSTEM AND RELATED METHOD

BACKGROUND OF THE INVENTION

The present invention relates to construction fasteners, and more particularly to a tool configured to precisely place and assist in guiding a fastener into a board.

There are a variety of commercially available fasteners that are designed to fasten a work piece, such as a wooden board or a composite element, to a substrate, such as a subfloor, joist or other underlying support structure. In many cases, these fasteners are in the form of threaded screws including a head to which an installation drive attaches (for example, a Phillips or star drive screw head); a shaft that projects from the head; threads on the shaft, and a tip or point. Recently, there have been developments in construction techniques and fastener technology that attach boards to a subfloor or underlying joist with screws, but that attempt to conceal the heads of those screws. This is achieved by advancing the screws at an angle through the sides of the boards, rather than the exposed upper surface or tops of the boards, and subsequently into an underlying support structure. When boards are placed side-by-side one another, these hidden screws are relatively unnoticeable by an observer looking straight down at the boards. Of course, at an angled view of the board, where portions of the sides of the boards may be visible, the screw heads may be somewhat visible, but usually not overly conspicuous.

An issue with conventional hidden screws concerns the execution of their installation. For example, sometimes, when a screw is started without precise positioning via a tool, the screw can bury into the corner of the board too high up on the rounded corner, and too close to the bearing or upper surface of the board. This can leave the screw rather conspicuous. Further, some installation tools do not always precisely position the screw along the corner of the board due to imperfections in the boards, especially natural wood boards. As a result, a number of screws along that corner can be misaligned or at varying depths from the upper surface along the corner, which can be unsightly or aesthetically displeasing.

Further, some installation tools are better suited for installing hidden screws in a corner of a first board before a second board is placed adjacent that first board. Yet other tools are better suited for installing hidden screws with consistent placement along the corner in a corner of the first board after the second board is placed adjacent the first board. When the incorrect tool is used, it may inadvertently place the screw in an aesthetically displeasing location along the corner of the board.

Accordingly, there remains room for improving fastener installation tools to precisely and consistently locate and install fasteners relative to corners and/or side surfaces of boards in an aesthetically pleasing manner.

SUMMARY OF THE INVENTION

A fastener installation tool can include a handle and a nose assembly including a guide defining a bore having a longitudinal axis, a first tooth adjacent the bore and a moveable second tooth. The first tooth or the second tooth can selectively engage an upper corner of a board or a side surface of a board to precisely position a fastener advanced through the bore in the upper corner of the board.

In one embodiment, the first tooth can be joined with the nose assembly and can selectively engage a round upper corner between an upper surface and a side surface of a board when a lower surface of the handle or a body of the tool is placed on the upper surface of the board. The first tooth can include a first engagement surface and an opposing first ramp that converge at a first tip. The first engagement surface can be configured to engage the round upper corner.

In another embodiment, the first tooth can be fixedly joined with the nose assembly and can extend downward therefrom. The guide can include a first opening into which a fastener enters the bore and a second opening from which the fastener exits the bore adjacent the second opening. The first tooth can extend downward from the nose assembly adjacent the second opening.

In still another embodiment, the second tooth can be joined with the nose assembly and can move from a retracted mode to an extended mode in which the second tooth is configured to engage the side of the board. The second tooth can include a second engagement surface and an opposing second ramp that converge at a second tip. This second tip can be configured to engage the side of the board.

In yet another embodiment, the second tooth can be joined with an armature guided at least partially by or within the nose assembly. The armature can include a button configured for manual engagement of a user to deploy the second tooth from the retracted mode to the extended mode. The armature can include a first stop. The second tooth can cease extension to the extended mode upon engagement of the first stop.

In even another embodiment, the tool can include a third tooth fixedly joined with the nose assembly and extending downward therefrom adjacent the second opening, on an opposite side of the second opening from the first tooth. The third tooth can include a third engagement surface and an opposing third ramp that converge at a third tip. The third engagement surface can be configured to engage the round upper first corner distal from the first engagement surface of the first tooth. In some cases, the first and third tooth can straddle the second opening, where the fastener exits the bore, with the distal tips thereof at a same or similar first level along the upper corner.

In a further embodiment, the tool can include a fourth tooth moveably joined with the nose assembly and fixedly joined with the second tooth. The fourth tooth can be simultaneously moveable with the second tooth from a retracted mode to an extended mode. The fourth tooth can be configured to engage the first side of the first board when the fourth tooth is in the extended mode.

In still a further embodiment, the second tooth and the fourth tooth can be connected via the armature, and can move together in unison. The second and fourth tooth can straddle the first tooth and the third tooth, and the second opening and/or the bore.

In yet a further embodiment, the first and/or third tooth can be used to align the longitudinal axis with the upper corner of the board and place it at a predetermined depth when the board is placed adjacent and contacting another board.

In even a further embodiment, the second and fourth tooth can be deployed to the extended mode when the board is not placed adjacent another board. The second and fourth tooth can engage a side surface of the first board, and align the longitudinal axis with the upper corner of the board and place it at the predetermined depth in this condition of the board.

In another embodiment, the first and/or third tooth can include a tooth planar that is perpendicular to a planar lower surface of the body of the tool. The longitudinal axis can intersect the tooth planar at a first angle of 20 degrees to 60 degrees, inclusive. The longitudinal axis can intersect the tooth planar at a depth below the planar lower surface. That depth can be less than an upper corner depth of the board, with that upper corner depth extending from the upper surface of the boar to the side surface of the board.

In still another embodiment, the first depth can be 0.010 inches to 0.125 inches, inclusive. In some cases the first depth can be 0.010 inches to 0.080 inches, inclusive. In another case the first depth can be 0.050 inch.

In yet another embodiment, the first angle can be 45 degrees to 75 degrees. In some cases, the first angle can be 50 degrees to 60 degrees inclusive. In another case, the first angle can be about 55 degrees.

In even another embodiment, the longitudinal axis can be oriented by the first and/or second tooth engaging the board to place that axis at a point of intersection with the board at a first depth being 0.010 inches to 0.125 inches, inclusive, or about 0.050 inches, below a lower surface of the handle.

In a further embodiment, a method is provided. The method can include providing a tool comprising a body with a lower surface, the body joined with a nose assembly including a guide defining a bore having a longitudinal axis, the guide having a first opening into which a fastener enters the bore and a second opening from which the fastener exits the bore, a first tooth fixedly joined with the nose assembly and extending downward therefrom adjacent the second opening, and a second tooth joined with the nose assembly and moveable from a retracted mode to an extended mode; placing the lower surface adjacent a first upper surface of a first board such that the first tooth extends downward from the nose assembly above a round upper first corner of the first board and such that the longitudinal axis aligns with the first round corner; and extending the second tooth from the retracted mode to the extended mode if a first side surface of the first board is unobstructed by a second board such that the second tooth is adjacent the first side surface of the first board.

In still a further embodiment, the method can include engaging the first tooth against the first upper corner if the first side surface is obstructed by a second board; and impairing the extension of the second tooth from the retracted mode to the extended mode if the first side surface is obstructed by the second board.

In yet a further embodiment, the method can include advancing a fastener through the bore such that a tip of the fastener engages the round upper first corner a depth of 0.025 inches to 0.125 inches, inclusive, below the lower surface.

In even a further embodiment, the method can include engaging the second tooth with a force against the side surface of the board when installing a fastener through the upper corner of the board to install the fastener at the first depth.

In a further embodiment, the method can include engaging the first tooth against an adjacent board that engages and/or contacts the placed board with a force when installing the fastener through the upper corner of the board to install the fastener at the first depth.

The current embodiments provide a fastener installation tool and method for efficiently and consistently installing fasteners in an upper corner of a board.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
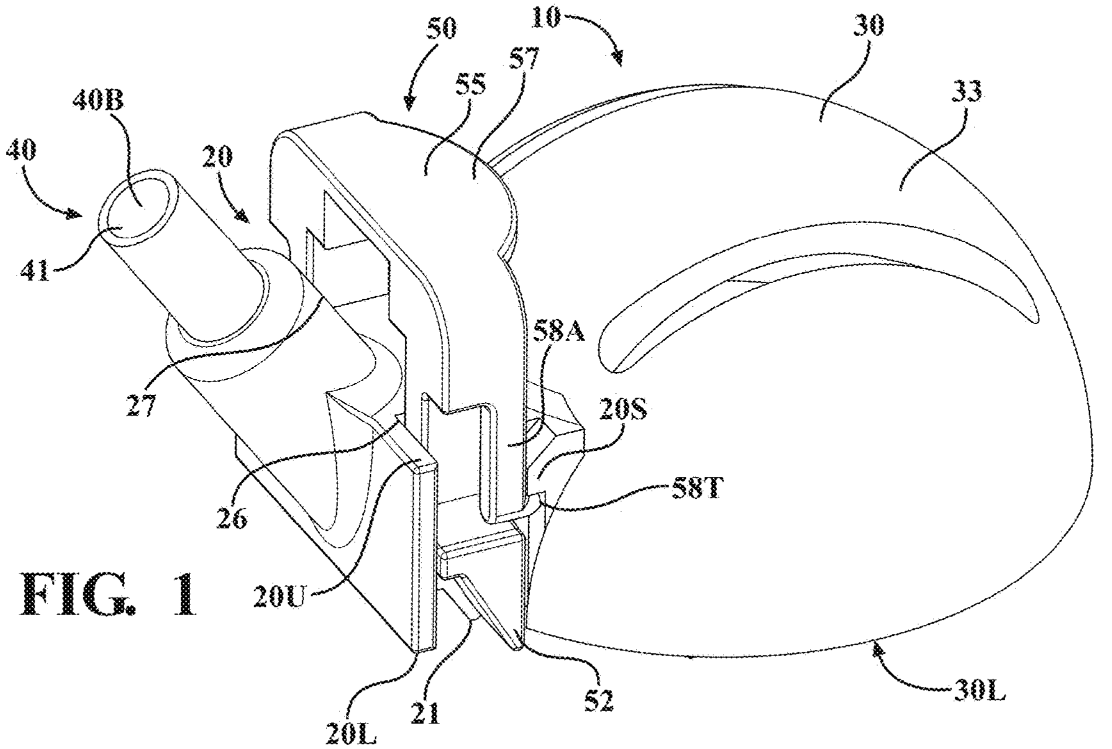
FIG. 1 is an upper perspective view of the fastener installation tool of a current embodiment.
Figure 2:
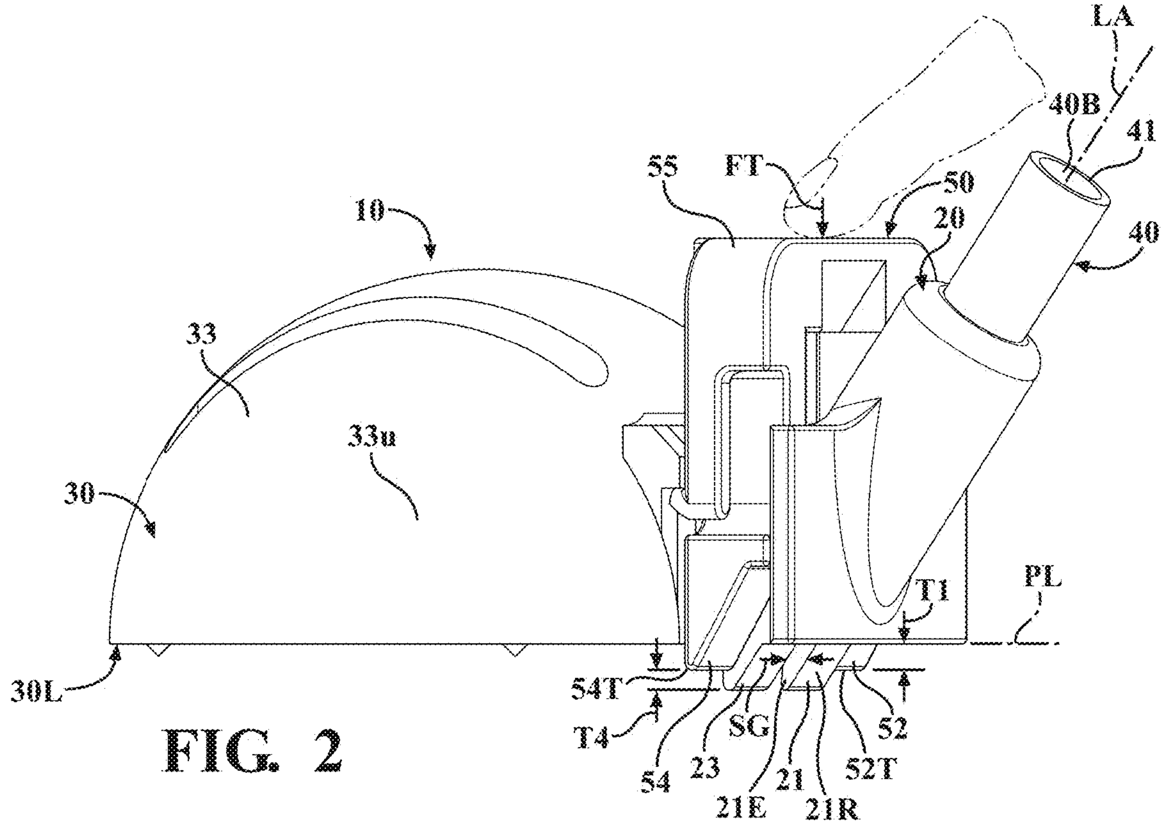
FIG. 2 is a lower perspective view of the fastener installation tool thereof showing a set of stationary teeth and a set of moveable teeth.
Figure 3:
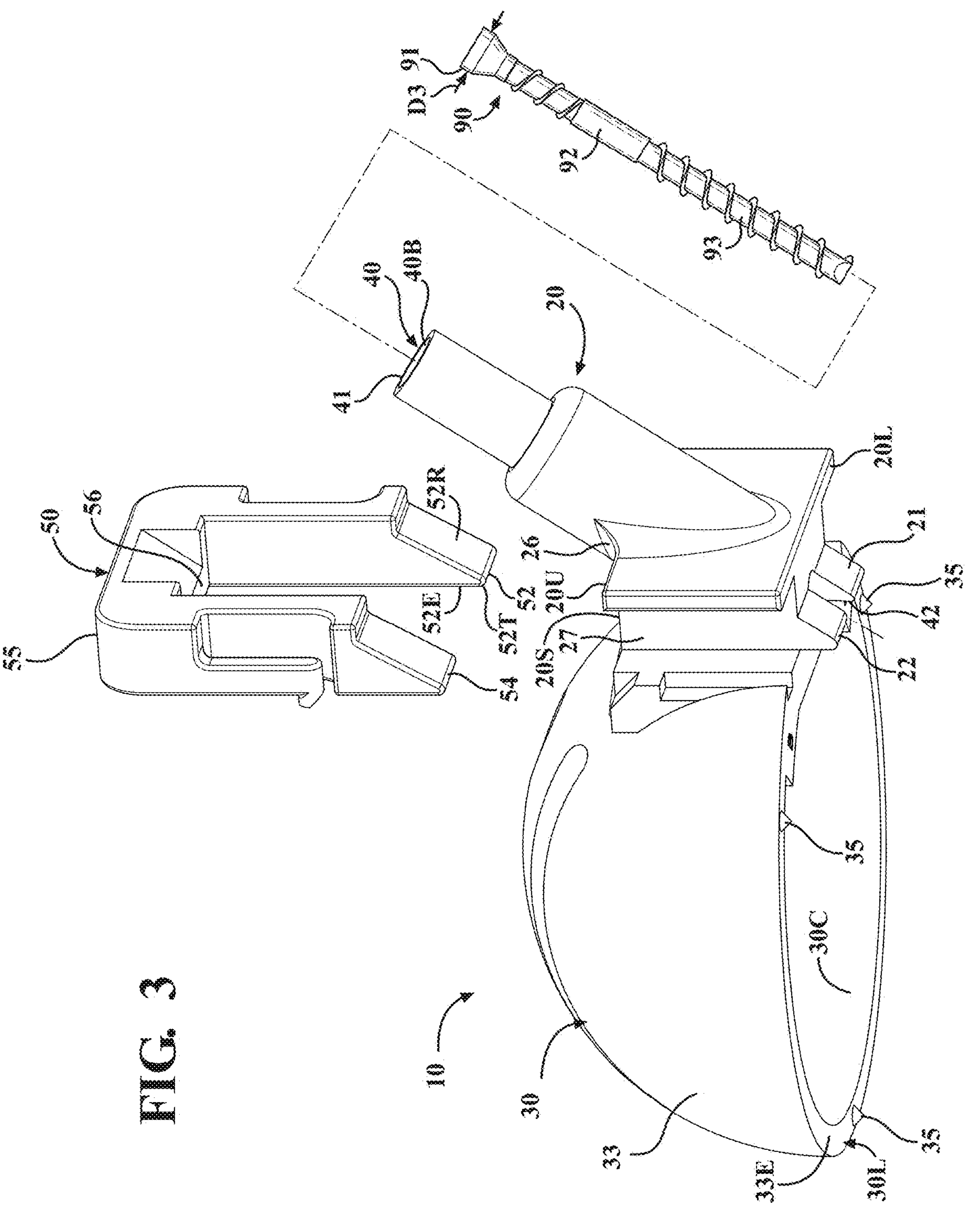
FIG. 3 is an exploded perspective view of the tool with an armature including the moveable teeth removed from a slot defined by a nose assembly of the tool.

A current embodiment of the fastener installation tool is shown in FIGS. 1-3 and generally designated 10. The tool 10 can be used to install boards on underlying substrates, subfloors or joists. The tool can be used with any boards, which can include deck boards, porch boards or other boards constructed from wood, particle board, composite boards, polymer boards, plastic boards, metal boards or extrusions, sheets, panels or other similar elongated workpieces. Some embodiments of the tool herein are well suited for use with wooden boards that might shrink after installation, with the optional different sets of teeth being suited to facilitate fastener installation in a board adjacent another board and/or adjacent no board. The tool 10 can provide a way to quickly and precisely align the fasteners with the respective upper corners and in some applications side surfaces of the boards and install the fasteners in a manner such that they are generally concealed from view. Further, the guide bore, and in particular the sleeve surrounding the bore can effectively prevent the threads of an advancing fastener from gouging, damaging or marring an immediately adjacent second board as that advancing fastener is advanced into a first board. The tool 10 shown in the figures can be constructed primarily from a polymeric material to reduce cost and weight to enable the tool to be included in packages of fasteners that can be installed with the tool 10. Optionally, other materials, such as metals, composites and combinations of the foregoing can be used to construct the tool and its components.

Fasteners suitable for use with the tool 10 can include a variety of fasteners. One such fastener is a small hidden fastener 90, shown in FIG. 3, including a head 91, a shaft 92 and a set of threads 93. Such fasteners can be in the form of pointed tip fasteners and/or bevel tip fasteners designed for boring into and advancing in a board. One type of such bevel tip fastener is the CAMO Edge™ fastener, available from National Nail Corporation of Wyoming, Michigan, and disclosed in U.S. Pat. No. 10,315,295 and entitled Fastener, Installation Tool and Related Method of Use, which is hereby incorporated by reference in its entirety. The types of fasteners 90 used herein with the tool 10 can include a relatively small head having a diameter D3. This small diameter D3 can allow the head to bury into a board and be less visible or generally more hidden. This diameter D3 can be optionally 0.100 inches to 0.275 inches, inclusive, 0.150 inches to 0.225 inches, inclusive, 0.150 inches to 0.210 inches, inclusive, 0.175 inches to 0.200 inches, inclusive, 0.150 inches, 0.175 inches, 0.200 inches, 0.210 inches, 0.225 inches, 0.250 inches, 0.275 inches, 0.300 inches, or other dimensions depending on the application. The tool 10 can be configured as described below to precisely place such small head diameter screws well along the upper corners of boards in a consistent and concealing manner.

The tool 10 shown in FIG. 1-3 can include nose assembly 20 that is joined with a body 30 including or formed with a handle 33. The nose assembly 20 can include a guide 40 and an armature 50 can be movably joined with the nose assembly 20. The nose assembly 20 can include a first tooth 21 and a third tooth 23 joined therewith, optionally in a fixed and immovable manner so that those teeth do not move relative to the nose assembly 20, the body 30 or handle 33. The armature can 50 can include a second tooth 52 and a fourth tooth 54. The second tooth and fourth tooth can be joined with the nose assembly and can be movable from a retracted mode shown in FIG. 1 to an extended mode shown in FIG. 6 as described further below.

The body 30 optionally can be of a dome or rounded shape. This can enable a user to easily grasp the tool in a variety of different orientations and configurations to align the nose assembly 20 and the guide 40 with an upper corner 101C of a board as described below. Optionally, the illustrated dome shape can replace with polygonal or other shapes depending on the application. The body 30 as mentioned above can serve as a handle 33. The handle 33 can have a smooth or textured surface, and/or a coating to enhance grip by a user. The handle can include a round upper surface 33U. The handle and/or the body can include a substantially planar lower surface 30L. The lower surface can be formed by and/or along a lower edge 33E of the handle 33. The lower surface, although shown as substantially planar in FIG. 3, alternatively, can have minor undulations, ridges, and projections, and yet still be considered planar or substantially planar. For example, as shown in FIG. 3, the lower surface 30L can include one or more points, projections, extensions, or teeth 35, all referred to herein as teeth. These teeth optionally can be in the form of downwardly extending cones. Optionally, the shape of the teeth can vary, and instead they can be angular, protrusions, points, pyramids, cylindrical pins, blades, or other types of projections. These teeth 35 generally can be configured to dig into a surface of a board upon which the tool 10 is placed by slightly penetrating and/or frictionally engaging a surface of the board, for example, an upper surface of a board. As a result, the body 30 and nose assembly 20 can be temporarily fixed in place relative to the board. This can impair or prevent the tool 10 from moving relative to the board as a fastener is advanced through the nose assembly 20 and the guide 40. In other applications, the teeth might be absent from the lower surface 30L and/or the body 30 entirely.

As shown in FIG. 3, the body 30 optionally can include a compartment 30C that extends upwardly and on the interior of the body 30. In this construction, the body 30 can be substantially hollow to reduce weight and the materials that form the body 30, the handle 33 and the tool 10 in general, thereby reducing cost of the tool. The nose assembly 20 can extend upwardly and can be joined with the handle 33. The nose assembly can extend from an upper portion 20U to a lower portion 20L. The lower portion 20L shown in FIG. 4 optionally can be at the same level as the substantially planar lower surface 30L of the body. The upper portion 20U can extend upwardly away from the lower portion 20L alongside the guide 40.

Figure 4:
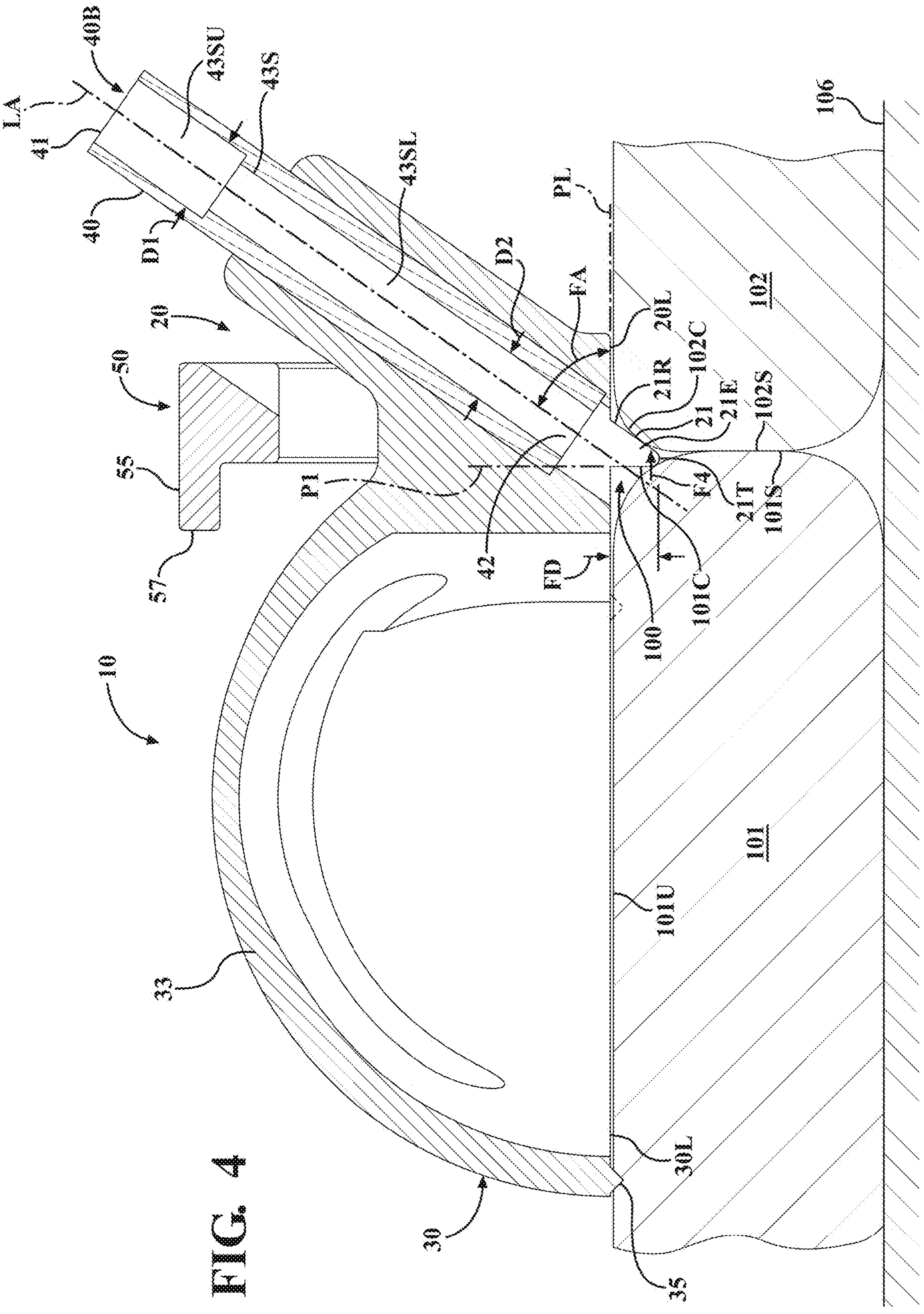
FIG. 4 is a section view of the tool installed on an upper surface of a first board, with a first tooth engaging a second board adjacent the first board to align a longitudinal axis of a guide bore with the first upper corner of the first board, and a second tooth in a retracted mode.

As shown in FIGS. 1-3, the guide 40 can include a bore 40B that extends from a first opening 41 to a second opening 42. The first opening can be configured so that a fastener 90 can enter the bore 40B. The second opening 42 can be distal from the first opening. The second opening can be configured so that the fastener can exit the bore 40B through the second opening. As shown in FIG. 4, the guide 40 optionally can include a sleeve 43S which can be constructed from a metal or composite or some other material stronger, harder and/or more durable than the body 30 and the nose assembly 20, which again can be constructed from a polymeric material or a softer material than the sleeve. Where the sleeve 43S is constructed from metal, it can withstand wear and tear and abrasion due to the fastener 90 being advanced through it and a corresponding bit of a power tool rotating the fastener 90 during installation in a board. The sleeve 43S optionally can be constructed to include an upper portion 43SU and a lower portion 43SL. The upper portion 43SU can include a first diameter D1 while the lower portion can include a second diameter D2. The first diameter D1 can be greater than the second diameter D2. The first diameter D1 can be larger to enable a tip or point of the fastener 90 to be quickly and easily installed in the sleeve 43S or guide 20 in general. The second diameter D2 optionally can be closer to the diameter of the head 91 of the fastener 90 to provide adequate guidance, direction and rotational constraint of the fastener and its head when rotating in the bore 40B. Further, the diameter D2 can be optionally 0.010 inches greater than the diameter D3 of the head, 0.025 inches greater than the diameter D3 of the head, 0.050 inches greater than the diameter D3 of the head, 0.075 inches greater than the diameter D3 of the head 91. Further optionally, the diameter D3 can be less than the diameter D1 in the upper portion 43SU of the sleeve 43S. Optionally, in other applications, the upper portion 43SU and lower portion 43SL of the sleeve 43S can be of a common or consistent diameter. In yet other applications, the portions can be tapered or sloped downwardly toward the lower surface of the nose assembly 20.

The bore 40B, the sleeve 43S, and the guide 40 itself can include a longitudinal axis LA extending down the center of the bore 40B. This bore optionally can be cylindrical as shown and can conclude one or more shoulders, steps or transitions therein depending on the application. The longitudinal bore 40B can be oriented relative to the fixed or stationary teeth 21 and 23 to provide a suitable trajectory of the fastener 90 when installing it relative to a board. In particular, the longitudinal axis LA of the bore 40B can be oriented at a first angle FA that intersects a first tooth plane P1 that is generally associated with the engagement surface 21E of the first tooth 21. This engagement surface 21E can be disposed opposite a ramp surface 21 that extends at an angle, for example, the first angle FA relative to the longitudinal axis as well. This first angle optionally can be 20° to 60°, inclusive, 25° to 55°, inclusive, 30° to 60°, inclusive, 45° to 55°, inclusive, 45° to 60°, inclusive, 50° to 55°, inclusive, about 45°, about 50°, about 55°, about 60°, or other angles, depending on the corner of the board into which the fastener is to be installed. As used herein, the term about can encompass the noted angle, as well as plus or minus up to and including 5 degrees when referring to angles, and the listing of angles with the word about can include the exact angle as well.

The first tooth plane P1 optionally can be perpendicular to the lower surface plane PL, which is a plane in which the substantially planar lower surface 30L of the body 30 or the handle 33 can lay within. Optionally, in some applications, this first tooth plane P1 can lay slightly offset from perpendicular relative to the lower surface, planar PL, for example, by about 1°, 2°, 3°, 4°, 5°, 10° or 15° from perpendicular, depending on the application. In other cases, this first tooth plane can be a plane that extends downward perpendicular to the lower surface plane PL, without reference to a particular tooth 21. The longitudinal axis LA as shown in FIG. 4 can intersect the first tooth plane P1 at a first depth FD below the substantially planar lower surface 30L and/or the lower surface plane PL.

This first depth FD can be selected and set to provide surprising and unexpected precision and consistent placement of fasteners advanced through the guide 40 and into an upper surface and in particular an upper corner 101C of a board. For example, the first depth FD can be optionally 0.001 inches to 0.200 inches, inclusive, 0.001 inches to 0.150 inches, inclusive, 0.001 inches to 0.125 inches, inclusive, 0.010 inches to 0.075 inches, inclusive, 0.045 inches to 0.065 inches, inclusive, 0.045 inches to 0.055 inches, inclusive, 0.050 inches, 0.040 inches, 0.045 inches, 0.050 inches, 0.055 inches, 0.060 inches, 0.070 inches, 0.080 inches, 0.090 inches, 0.100 inches, 0.110 inches, 0.125 inches, 0.150 inches, or other first depths, depending on the application and the size of the head 91 of the fastener 90 that is to be advanced through the tool and installed in a board upper corner. With this first depth FD of the tool of the current embodiment, the fastener 90 can be advanced within and penetrate into an upper corner 101C of a board between the upper surface 101U of the board and the side surface 101S of the board sufficiently closer to the side surface than the upper surface, and thus can hide the fastener well within a crevice that is formed between the first board and a second board placed immediately adjacent the fastened board as described below.

As mentioned above and shown in FIG. 1-4, the nose assembly can include a first tooth 21 and a third tooth 23. The first tooth and the third tooth can straddle and/or be disposed on opposite sides of the second opening 42. Optionally, in some applications, the first tooth and third tooth can form, surround, be coextensive with or otherwise associated with the second opening 42. The first tooth and the third tooth can be substantially identical except for their placement and therefore only the first tooth 21 will be described in substantial detail. The first tooth 21 can include a first engagement surface 21E and an opposing first ramp 21R. The first engagement surface 21E can be configured to at least partially and/or fully engage the round upper first corner 101C, optionally with or without a first tip 21T that forms the lower portion of the tooth 21 and that engagement surface 21E. The tip 21T can be rounded and can transition forward to the engagement surface 21E. Indeed, the engagement surface 21E and the tip 21T can be coextensive with one another about a rounded and/or angled corner or the tip 21T, or engagement surface 21E can directly engage around the upper corner. Optionally, the engagement surface 21E can be concave or convex forward, generally facing toward the board 101. As shown in FIG. 4, however, the engagement surface 21E can be generally planar and perpendicular to the lower surface 30L of the handle or body. As mentioned above, the first tooth plane P1 can extend along the engagement surface 21E and can be optionally perpendicular to the lower surface planar PL. Optionally, the precise orientation of the engagement surface 21E can vary, depending on the application and the configuration of the guide 40 relative to the tooth 21. The third tooth 23 also can include a similar engagement surface, ramp and tip and other similar geometry and shapes as the first tooth. The third tooth can be distal from the first tooth and again can be separated therefrom by a separation gap SG shown in FIG. 2. That separation gap SG can be larger than or equal to the size or diameter D2 of the sleeve 43S or generally equal to or larger than the diameter D3 of the head 91 of the fastener 90 so that the fastener can pass between the respective teeth, or at least a portion of them, into the upper corner 101C of the board 101. Optionally, the first tooth and the third tooth can be merged along their ends to form a continuous singular distal tip that extends from the first tooth to the third tooth with a gap or opening only formed above that tip to accommodate the opening or the advancement of the fastener 90.

Figure 8:
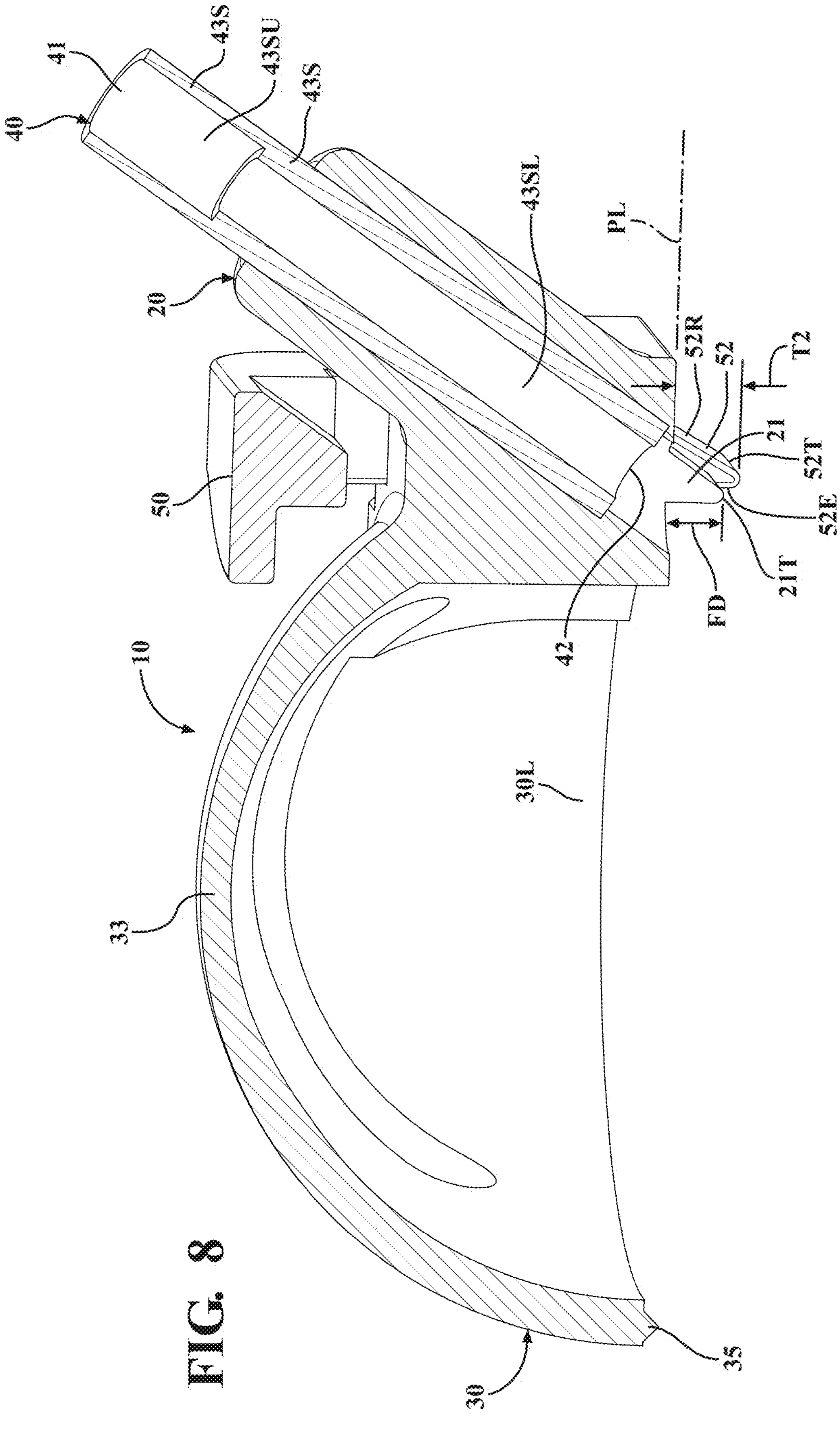

As mentioned above and shown in FIG. 1-3, the tool 10 can include a second tooth 52. The second tooth 52 can be movably joined with a nose assembly 20. The nose assembly can include a slot 26 which can be disposed within the nose assembly, adjacent the guide 40. The second tooth 52 can be at least partially journalled in slot 26, which can provide a movement path along which the second tooth 52 can be movable from a retracted mode shown in FIGS. 1 and 2 to an extended mode shown in FIGS. 6 and 8. The second tooth 52 can include a second engagement surface 52E and a second ramp 52R opposite the engagement surface 52E. The second engagement surface 52E and ramp 52R can converge at a tip 52T. The second engagement surface 52E can include and be formed at least partially by the tip 52T. The second engagement surface and/or the tip can be configured to engage a first side surface 101S of the first board 101 as described further below, when the second tooth 52 is in the extended mode shown in FIG. 6.

As mentioned above, the fourth tooth 54 can be similar to and can have the same features as the second tooth 52. For example, the fourth tooth 54 also can include a fourth engagement surface 54E, a fourth ramp 54R, and a fourth tip 54T, which can be virtually identical to those features on the second tooth 52 and therefore will not be described again here. The fourth tooth, however, can be disposed on the opposite side of the second opening 42. The first tooth 51 and third tooth 53 can be straddled by the second tooth 52 and the fourth tooth 54 on opposite sides thereof. The first tooth and third tooth can be disposed or located between the second tooth and the fourth tooth, optionally when the second tooth and fourth tooth are in the retracted and/or extended mode, or a position therebetween. Optionally, where there are varying numbers of teeth from that shown in the current embodiment, there might not be such straddling of the stationary teeth between movable teeth.

The second tooth 52 and the fourth tooth 54 where included, as mentioned above, can be movable. As an example, the second tooth 52 and the fourth tooth 54 can move between the retracted mode shown in FIG. 1 to the extended mode shown in FIGS. 6 and 8. In so doing, the second and fourth tooth can move such that the tip 52T and 54T of the respective teeth can vary in position relative to the planar lower surface 30L and/or the lower surface plane PL. These tips also can move relative to the first tooth 21 and third tooth 23. For example, as shown in FIG. 2, the second tooth 52 can be disposed such that the tip 52T is a second depth T1 from the lower surface 30L and/or the lower surface planar PL. The second tooth 52, as well as the fourth tooth 54 is in the retracted mode in this configuration shown in FIG. 2. A user can depress the armature 50, to which the second tooth 52 and fourth tooth 54 are attached, thereby moving or converting the second tooth 52 and the fourth tooth 54 where included from the retracted mode to an extended mode. The extension can continue until the second tooth achieves the position shown in FIG. 8 in the fully extended mode. As shown there, the second tooth 52 is extended to a second tooth depth T2. This depth T2 can be greater than the depth T1 of the tooth 52 in the retracted mode. Thus, the second tooth 52 can extend farther from the substantially planar lower surface 30L and/or the lower surface plane PL than the first tooth 21.

The second tooth 52 and the fourth tooth 54 also can extend different distances relative to the first tooth 21 and the third tooth 23. For example, as shown. in FIG. 2, in the retracted mode the second tooth 52 and fourth tooth 54 can extend a distance or depth T4 above the tip 21T of the first tooth and third tooth. Particularly, the second tip 52T can extend the distance T4 above the first tip 21T. Thus, in the retracted mode, the second tooth and fourth tooth can be disposed above the tips of the third tooth and first tooth. In contrast, when the armature 50 and the respective teeth 52 and 54 are deployed from the retracted mode to the extended mode, shown in FIG. 6, the tips 52T and 54T of the second tooth and fourth tooth are repositioned lower, and extend beyond the third tooth 21 and first tooth 21. As a result, the tip 52T extends below the tip 21T by distance or depth T5. The depth T5 optionally can be greater than the tooth depth FD of the first tooth 21 and/or optionally greater than the depth T4.

Figure 6:
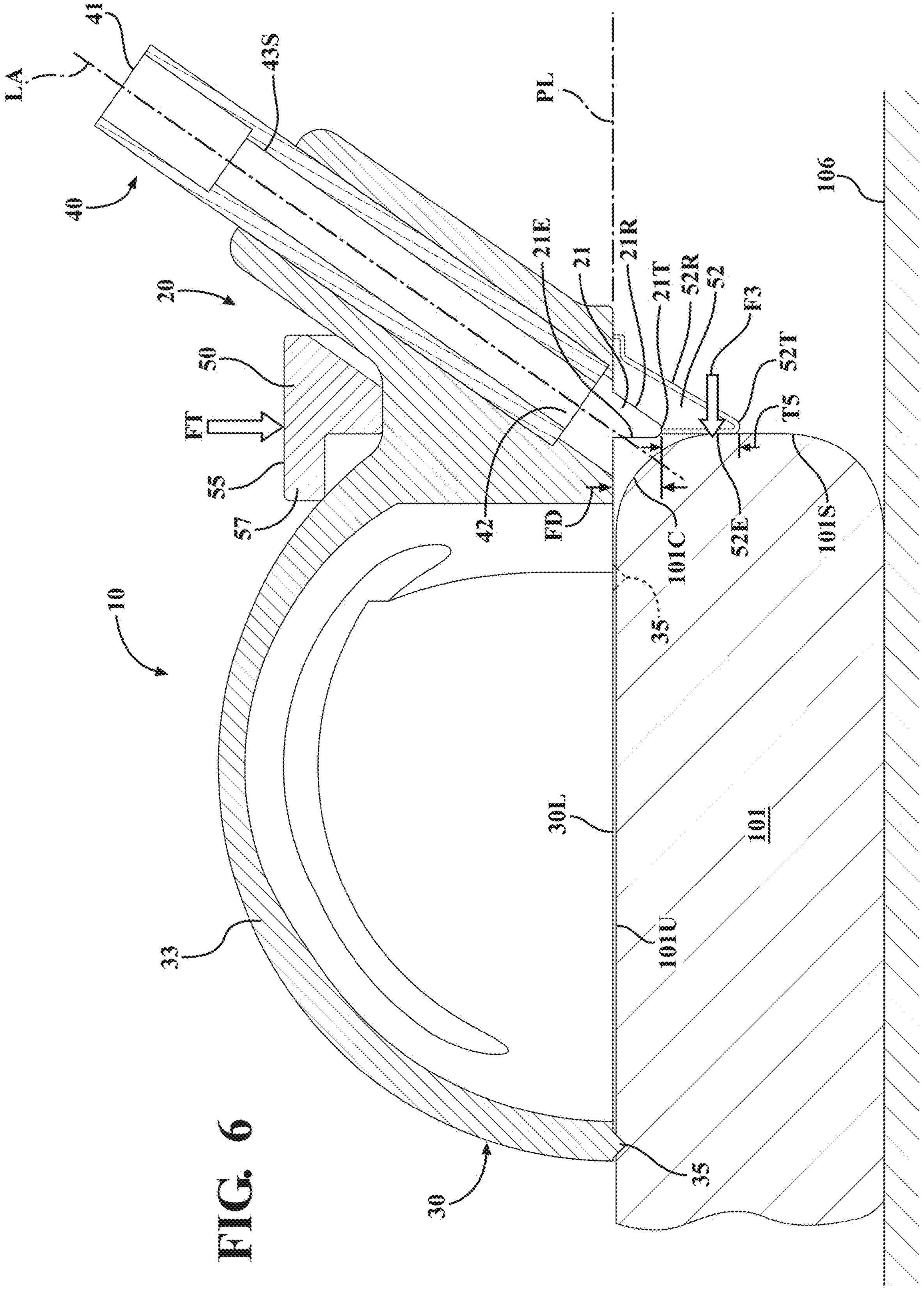
FIG. 6 is a section view of the tool installed on the upper surface of the first board, with the second tooth in an extended mode and engaging or contacting the first side surface of the first board before the second board is placed adjacent the first board to align the longitudinal axis of the guide bore with the first upper corner of the first board.

Accordingly, the second tooth 52 and fourth tooth 54 can extend farther away from the lower surface 30 and the lower plane P1. Optionally, due to this farther extension in the extended mode, the second tooth 52 and/or the fourth tooth 54 can directly contact and engage a side surface 101S of the board 101 as shown in FIG. 6, which is below the corner 101C. As described below, this can result in the second tooth and fourth tooth optionally simultaneously engaging the side surface 101S of the 101, without the first tooth 21 and third tooth 23 engaging the corner 101C of the board. As described below, this solid and robust engagement of the teeth with the side surface can prevent and/or impair movement of the tool 10 relative to the board 101, which in turn can cause the fastener advanced through the tool to enter into the upper corner 101C too high or too low along that corner, or into the sidewall 101S.

The second tooth 52 and fourth tooth 54 can be connected via an armature 50. This armature 50 can include a button 55 mounted atop the armature. The button 55 can be located between the handle 33 and the nose assembly 20 or guide 40 of the tool 10 as shown in FIG. 2-4. The button can be configured for manual engagement by a user to deploy the second tooth and fourth tooth from the retracted mode to the extended mode. For example, in comparing FIG. 2 with FIG. 6, a user can exert a force FT on the button 55 and move the armature and thus the second tooth 52 and the fourth tooth 54 from the retracted mode shown in FIG. 2 to the extended mode shown in FIG. 6. When this occurs, the distances and depths of the second tooth and fourth tooth change relative to the lower surface 30, the lower plane PL, as well as the tips of the first and third teeth as described above.

The armature 50 can at least partially fit within the one or more slots 26 and 27 defined by the nose assembly 20. These slots can generally constrain the movement of the second tooth and fourth tooth along respective vertical paths. Optionally, the armature 50 can include one or more stops 56 and/or 57. The stop 56 can engage the limiter surface 20S of the nose assembly 20 when the armature 50 is pushed or moved or moves downward, such as when the second tooth 52 and fourth tooth 54 slide or otherwise move within the respective slots 26 and 27. When this occurs, the second tooth and fourth tooth can cease extension to the extended mode upon such engagement of the stop and limiter. The second tooth and fourth tooth thus can extend no farther. The additional or alternative stop 57 can form a portion of the button 55. The stop 57 can be in the form of a cantilevered flange that extends outwardly over the upper surface of the handle 33. The stop 57 can remain above and out of contact with the handle as shown in FIG. 4 in the retracted mode. However, when it is deployed, the armature moves downward and the stop 57 engages the upper surface of the handle 33 and stops extension of the second tooth and fourth tooth to the extended mode. Optionally, the limiters and stops can come in other configurations to cease movement of the armature 50 and the respective second tooth and fourth tooth. In other applications, the armature can be simplified and may only be associated with a single moving tooth.

Optionally, the armature 50 can engage the nose assembly 20 and/or the body 30 to restrain its movement along a substantially vertical path as the armature and respective second tooth and fourth tooth move between the retracted mode and the extended mode. In some cases, the armature 50 can be at least temporarily secured to the nose assembly, so it cannot become disassociated from it. As an example, the armature 50 can include a first finger 58A that extends downward alongside and above the second tooth 52. This first finger can include a first tab 58T. The nose assembly can include a shoulder 20S. The shoulder 20S can extend into and/or toward the first slot 26. The first tab 58 can interfere with the first shoulder 20S to prevent the armature 50 from being disassociated from the nose assembly 20. In particular, the tab 58T can prevent the armature and its components from being withdrawn from the slots 26 and 27 when it directly engages the shoulder 20S.

The finger 58A can be flexible or resilient enough so that it can be bent such that the tab can move around or over the shoulder to remove the armature 50 from the nose assembly and thus the second tooth 52 and fourth tooth 54 from the respective slots 26 and 27. The armature 50 and respective second tooth and fourth tooth however can be easily replaced in the slots in position in the retracted mode ready for deployment to the extended mode when appropriate.

A method of using the faster insulation tool 10 described above will now be described. In general, the tool 10 can be provided with the respective first and third teeth fixedly joined with a nose assembly 20, and the second and fourth teeth joined with a nose assembly and movable from a retracted mode to an extended mode. The lower surface 30L of the handle 33 and/or the body 30 can be placed adjacent an upper surface of a first board 101 as shown in FIG. 4. The first tooth 21 and any third tooth 23 can extend downward from the nose assembly 20, generally above and/or contacting the round upper first corner 101C of the first board 101. In this configuration, the first engagement surface 21E and the tip 21T can engage the board along that round upper first corner 101C. In doing so, the longitudinal axis LA can align with the round upper first corner 101C. The second tooth 52, and optionally, the fourth tooth 54, can be extended from the retracted mode to the extended mode if a first side surface of the board is unobstructed by a second board, such that the second tooth and/or fourth tooth is adjacent and/or contacting the first side surface 101S of the first board as shown in FIG. 6.

More particularly, a user can identify a first board 101 that is to be installed relative to an underlying joist 106 or substructure. If the first board 101 is placed on the joist 106 without a second board 102 being placed adjacent the first side surface 101S of the first board 101, that first side surface 101S is unobstructed by second board as shown in FIG. 6, so the user can place the tool 10 so the teeth 35 engage the upper surface 101U of the board 101 to engage that upper surface. The user can push downward on the button 55 of the armature 50 or the force of gravity can act upon the armature. As a result, the second tooth 52 and fourth tooth 54 can deploy downward and extend beyond the first tooth 21 and third tooth 23. Accordingly, the engagement surfaces of the second tooth and fourth tooth can face toward the first surface 101S of the board. The user can slide the teeth 35 along the upper surface of the board until the engagement surface 52E of the second tooth engages the side surface 101S. The user can apply force F3 to push the engagement surface 52E against the side surface 101S of the first board 101 to ensure adequate registration of the teeth 52 and 54 with the board. When this occurs, the user can be confident that the longitudinal axis LA of the bore is aligned with the round upper first corner 101C of the board such that when the fastener 90 is advanced through the guide 40 and into that side round upper first corner 101C, it will enter and be disposed determine distance below the upper surface 101U of the board, and in an aesthetically pleasing location, optionally closer to the side surface 101S than the upper surface 101U option.

After the tool 10 is so placed, the user can push down on the handle or body, pushing the teeth 35 into and or in engagement with the upper surface 101C, or the lower surface 30L in contact with the upper surface 101U where the teeth are absent, thereby holding the tool in a relatively fixed position relative to the board 101. The fastener 90 can be advanced through the upper corner 101C and into the underlying substrate or joist 106 to secure the board 101 to that joist 106. After the fastener is advanced and installed, the tool can be moved along the board to install another fastener in a similar manner.

A user also can install fasteners with the tool 10 when the first board 101 is placed adjacent a second board 102. For example, as shown in FIG. 4, the first board 101 is immediately adjacent the second board 102, which may or may not be fastened to the joist. The boards may be directly contacting one another. For example, first side surface 101S can be in direct contact with second side surface 102S. The user can install the body 30 atop the first board upper surface 101U, with the lower surface 30L adjacent the upper surface 101U. Where included, the optional teeth can engage that upper surface to position the tool. The lower surface 30L can be placed adjacent and/or in direct contact with the upper surface 101U. Again, if the lower surface 30L includes the teeth 35, the tool can be held stationary relative to that upper surface. The user can insert the first tooth 21 and third tooth 23 into the crevice 101V formed between the round upper first corner 101C and the round upper second corner 102C of the second board 102. The user optionally can push with a force F4 the tooth 21 and tooth 23 against the round upper second corner 102C. The engagement surfaces 21E and 23E, and tips 21T and 23T can engage the first corner 101C and the second corner 102C. This can occur as the lower surface 30L is placed adjacent the upper surface 101U of the first board 101.

The second tooth 52 and optional fourth tooth 54 as well as the armature 50 can remain in a retracted mode as shown in FIG. 4. That is, the second tooth and fourth tooth do not deploy fully or entirely to the extended mode, and in some cases may remain in the retracted mode. Generally, the extension of the second tooth and fourth tooth is impaired or prevented so these teeth cannot extend to the fully extended mode because the side surface 101S is obstructed by the second board 102. Thus, the first tooth and second tooth can engage the corner and set the guide 40 relative to the round upper first corner 101C to ready and position that guide for installation and advancement of the fastener 90 through the round upper corner 101S and into the underlying joist 106. Again, the precise position of the fastener can be controlled by the orientation of the longitudinal axis and the first depth FD thereof that places the fastener tip against the upper corner.

Figure 5:
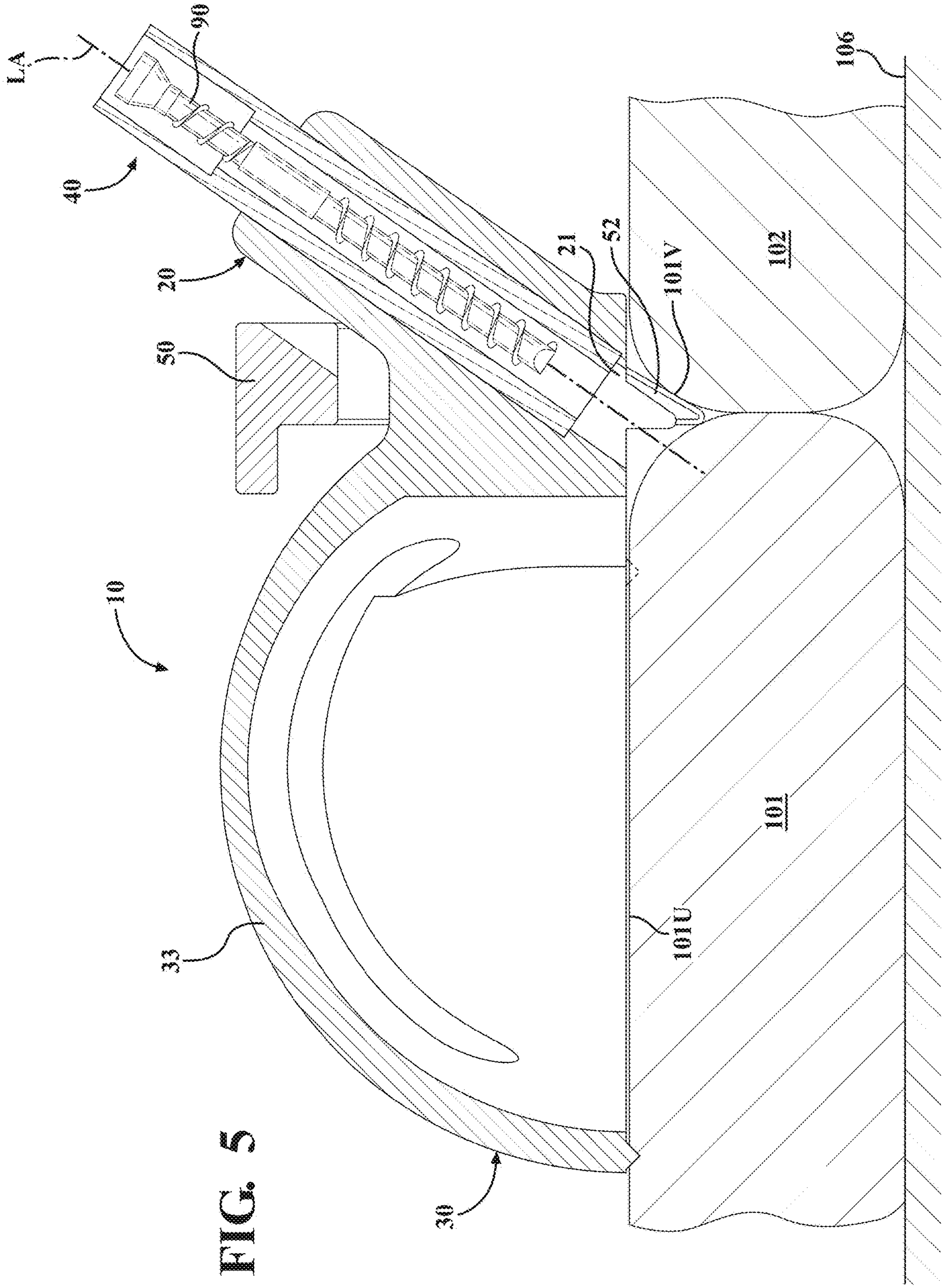
FIG. 5 is a section view of the tool installed on the upper surface of the first board, with the first tooth engaging the second board adjacent the first board to align the longitudinal axis of a guide bore with the first upper corner of the first board, and the second tooth in a partially extended mode between the first board and the second board.

In some cases, as shown in FIG. 5, the second tooth 52 might extend slightly below the tooth 21 in the crevice 101V. In this configuration, the second tooth and fourth tooth can be in a partially extended mode, but not fully extended. This extension may be due to irregularities in the board, or generally the corner of the board not being well defined. The teeth 52 and 54 can generally drop into the crevice under the force of gravity or a user pushing the armature downward. The first and third teeth however, can be in contact with the upper corner 101C. The fastener 90 can be advanced into the upper corner 101C as noted above.

Figure 7:
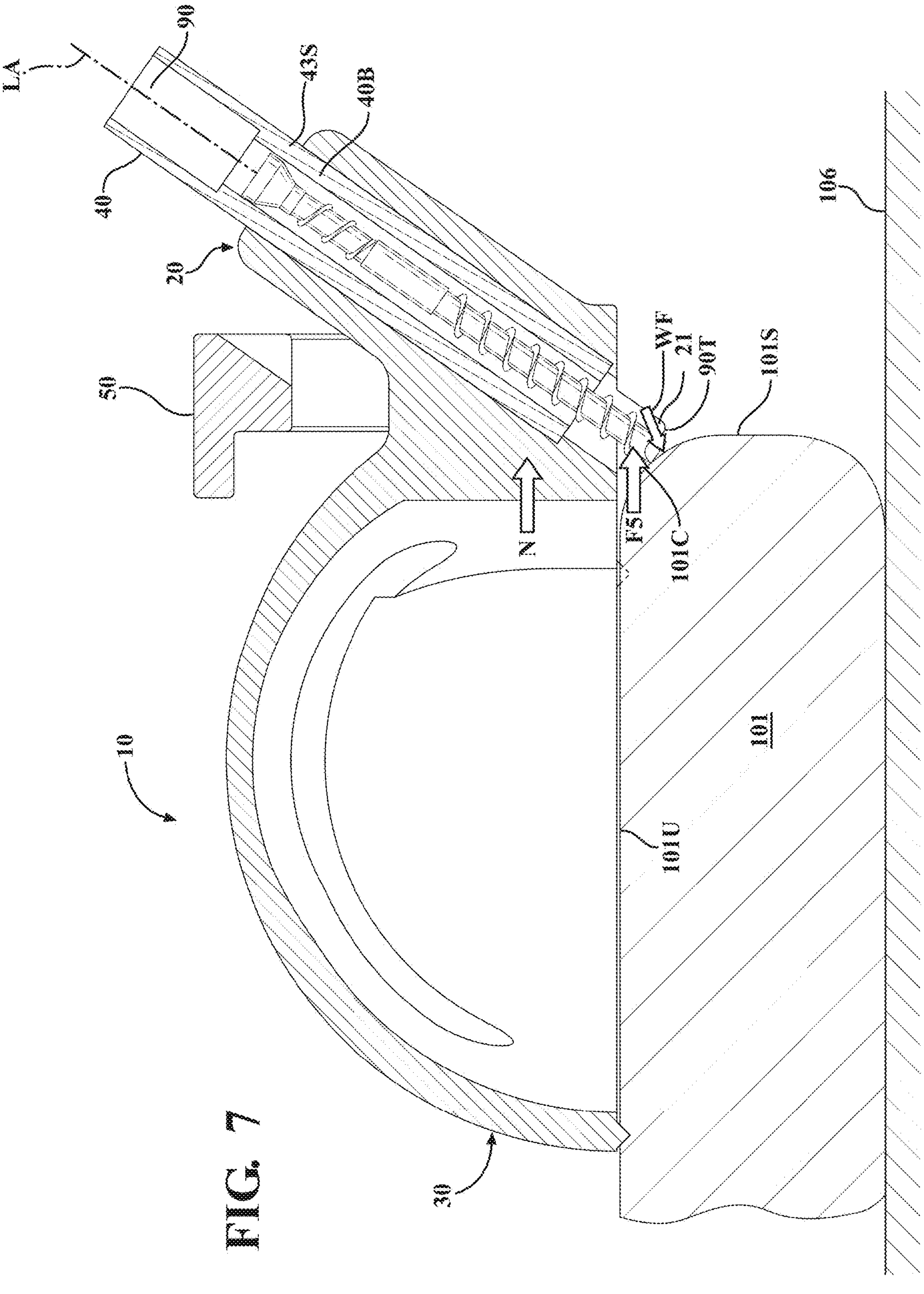
FIG. 7 is a section view of the tool installed on the upper surface of the first board, with the second tooth in a retracted mode, the first tooth engaging or contacting the first upper corner of the first board, and a fastener walking along the first upper corner to push the longitudinal axis and first tooth away from the first upper corner to further demonstrate function of the second tooth during fastener installation in a first board with no adjacent second board.

In some cases, when a first board is unobstructed by a second board adjacent the side surface of the first board, and the second tooth and/or fourth tooth remain in the retracted mode. This may cause the tool 10 to shift, which illustrates the helpfulness of the second tooth and fourth tooth in some applications. For example, as shown in FIG. 7, the armature 50 is in the retracted mode and so are the second tooth and the fourth tooth. The first tooth 21 and third tooth 23 initially can be placed adjacent and contacting the round upper corner 101C. When a fastener 90 is advanced through the bore 40B of the guide 40, however, that fastener may walk or wobble along a pathway WF down the corner 101C toward the side surface 101S of the first board 101. This walking or wobbling can be caused by the shape or geometry of the tip 90T of the fastener 90, for example, when it includes a beveled tip. As a result, the fastener can exert a force F5 on the tool 10, which can move the tool 10 in direction N along the upper surface 101U. This in turn can cause the fastener 90 to be moved downward such that it enters the board 101 at a location misaligned with the round upper corner 101C. As a result, it might enter to the side surface 101S too far down the board or in an inconsistent location with other fasteners installed relative to the board 101. This can result in aesthetically displeasing or inconsistently placed fasteners along the corner 101C of the board 101. Again, this situation can be prevented and/or mitigated by deployment of the armature 50 and the associated movable second tooth 52 and fourth tooth 54 from the retracted mode to the extended mode shown in FIGS. 6 and 8, so those teeth directly engage the side surface of the first board and provide stable engagement of the tool with the board.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

Reference throughout this specification to "a current embodiment" or "an embodiment" or "alternative embodiment" means that a particular feature, structure, or characteristic described in connection with the embodiment is included in at least one embodiment herein. Accordingly, the appearance of the phrases "in one embodiment" or "in an embodiment" or "in an alternative embodiment" in various places throughout this specification are not necessarily all referring to the same embodiment. Additionally, the particular features, structures, or characteristics of one embodiment are contemplated for proper and full combination in any suitable manner in one or more other embodiments, which is fully contemplated herein. Further, features, structures, or characteristics of one embodiment or multiple embodiments are readily and completely mixed and matched with any features, structures, or characteristics of any other embodiment or multiple embodiments in varying combinations and permutations.

What is claimed is:

1. A fastener installation tool comprising:

a handle including a round upper surface and a lower surface configured to engage a first upper surface of a first board having a round upper first corner located between the first upper surface and a first side surface;

a nose assembly joined with the handle, the nose assembly including a guide defining a bore having a longitudinal axis, the guide having a first opening into which a fastener enters the bore and a second opening from which the fastener exits the bore;

a first tooth fixedly joined with the nose assembly and extending downward therefrom adjacent the second opening, the first tooth including a first engagement surface and an opposing first ramp that converge at a first tip, at least one of the first engagement surface and the first tip configured to engage the round upper first corner; and a second tooth moveably joined with the nose assembly and journaled in a slot that provides a movement path along which the second tooth is moveable from a retracted mode to an extended mode, the second tooth including a second engagement surface and an opposing second ramp that converge at a second tip, at least one of the second tip and the second engagement surface configured to engage the first side surface of the first board when the second tooth is in the extended mode.

2. The fastener installation tool of claim 1, wherein the first engagement surface includes a first tooth plane that is perpendicular to the lower surface, wherein the longitudinal axis intersects the first tooth plane at a first angle of 20 degrees to 60 degrees, inclusive, wherein the longitudinal axis intersects the first tooth plane at a first depth below the lower surface, the first depth being 0.010 inches to 0.125 inches, inclusive.

3. The fastener installation tool of claim 2, wherein the first angle is 50 degrees to 60 degrees, inclusive, wherein the first depth is 0.040 inches to 0.60 inches, inclusive.

4. The fastener installation tool of claim 3, wherein the first depth is 0.50 inches, wherein the first angle is 55 degrees.

5. The fastener installation tool of claim 3, wherein the first depth is 0.050 inches, wherein the first angle is about 55 degrees.

6. The fastener installation tool of claim 1 comprising:

a third tooth fixedly joined with the nose assembly and extending downward therefrom adjacent the second opening, on an opposite side of the second opening from the first tooth, the third tooth including a third engagement surface and an opposing third ramp that converge at a third tip, the third engagement surface configured to engage the round upper first corner distal from the first engagement surface; and a fourth tooth moveably joined with the nose assembly and fixedly joined with the second tooth, the fourth tooth simultaneously moveable with the second tooth from a retracted mode to an extended mode, the fourth tooth including a fourth engagement surface and an opposing fourth ramp that converge at a fourth tip, the fourth engagement surface configured to engage the first side of the first board when the fourth tooth is in the extended mode.

7. The fastener installation tool of claim 6, wherein the first tooth and the third tooth straddle the second opening, wherein the second tooth and the fourth tooth are connected by an armature, wherein the first tooth and the third tooth are located between the second tooth and the fourth tooth.

8. The fastener installation tool of claim 6, wherein the second tooth and the fourth tooth are connected via an armature, wherein the armature includes a button configured for manual engagement of a user to deploy the second tooth and fourth tooth from the retracted mode to the extended mode.

9. The fastener installation tool of claim 8, wherein the armature includes a first stop, wherein the second tooth ceases extension to the extended mode upon engagement of the first stop.

10. The fastener installation tool of claim 9, wherein the first stop engages the round upper surface to cease extension to the extended mode.

11. The fastener installation tool of claim 1, wherein the nose assembly defines the slot, wherein a first shoulder projects into the slot, wherein the second tooth is joined with an armature, wherein the armature includes a first finger, wherein the first finger includes a first tab, wherein the first tab interferes with the first shoulder to prevent the armature from being disassociated from the nose assembly.

12. A fastener installation tool comprising:

a handle including a body configured to be placed adjacent a first upper surface of a first board having a round upper first corner located between the first upper surface and a first side surface;

a nose assembly joined with the handle, the nose assembly including a guide defining a bore having a longitudinal axis, the guide having a first opening into which a fastener enters the bore and a second opening from which the fastener exits the bore;

a first tooth fixedly joined with the nose assembly and extending downward therefrom adjacent the second opening, the first tooth configured to engage the round upper first corner between the first upper surface and the first side surface; and a second tooth joined with the nose assembly and moveable from a retracted mode to an extended mode, the second tooth configured to engage the first side surface of the first board when the second tooth is in the extended mode.

13. The fastener installation tool of claim 11, wherein the first tooth includes a first tip, wherein the second tooth includes a second tip, wherein the second tip is disposed above the first tip when the second tooth is in the retracted mode and the body is placed adjacent the first upper surface of the first board, wherein the second tip is disposed below the first tip when the second tooth is in the extended mode and the body is placed adjacent the first upper surface of the first board.

14. The fastener installation tool of claim 12, wherein the handle includes a domed upper surface, wherein the nose assembly defines a slot, wherein the second tooth is joined with an armature slidably disposed in the slot.

15. The fastener installation tool of claim 14, wherein the nose assembly includes a stop, wherein the armature includes a limiter, wherein the limiter engages the stop to cease movement of the armature in the slot.

16. The fastener installation tool of claim 12, wherein the first tooth includes a first tooth planar that is perpendicular to a planar lower surface of the body, wherein the longitudinal axis intersects the first tooth planar at a first angle of 20 degrees to 60 degrees, inclusive, wherein the longitudinal axis intersects the first tooth planar at a first depth below the planar lower surface, the first depth being less than a first corner depth of the first board, the first corner depth extending from the first upper surface to the first side surface.

17. A method of using a fastener installation tool, the method comprising:

providing a tool comprising a body with a lower surface, the body joined with a nose assembly including a guide defining a bore having a longitudinal axis, the guide having a first opening into which a fastener enters the bore and a second opening from which the fastener exits the bore, a first tooth fixedly joined with the nose assembly and extending downward therefrom adjacent the second opening, and a second tooth joined with the nose assembly and moveable from a retracted mode to an extended mode;

placing the lower surface adjacent a first upper surface of a first board such that the first tooth extends downward from the nose assembly above a round upper first corner of the first board and such that the longitudinal axis aligns with the round upper first corner; and extending the second tooth from the retracted mode to the extended mode if a first side surface of the first board is unobstructed by a second board such that the second tooth is adjacent the first side surface of the first board.

18. The method of claim 17, comprising:

engaging the first tooth against the first upper corner if the first side surface is obstructed by a second board; and impairing the extension of the second tooth from the retracted mode to the extended mode if the first side surface is obstructed by the second board.

19. The method of claim 18 comprising:

advancing a fastener through the bore such that a tip of the fastener engages the round upper first corner a depth of 0.025 inches to 0.125 inches, inclusive, below the lower surface.

20. The method of claim 19, wherein the depth is about 0.050 inches.

* * * * *